(12) United States Patent
Taniyama

(10) Patent No.: US 12,454,437 B2
(45) Date of Patent: Oct. 28, 2025

(54) ELEVATOR GROUP MANAGEMENT DEVICE AND ELEVATOR SYSTEM

(71) Applicant: Mitsubishi Electric Corporation, Tokyo (JP)

(72) Inventor: Kenji Taniyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1359 days.

(21) Appl. No.: 16/973,046

(22) PCT Filed: Jul. 5, 2018

(86) PCT No.: PCT/JP2018/025548
§ 371 (c)(1),
(2) Date: Dec. 8, 2020

(87) PCT Pub. No.: WO2020/008595
PCT Pub. Date: Jan. 9, 2020

(65) Prior Publication Data
US 2021/0269277 A1    Sep. 2, 2021

(51) Int. Cl.
*B66B 1/24* (2006.01)
*B66B 1/28* (2006.01)
(Continued)

(52) U.S. Cl.
CPC .............. *B66B 1/2458* (2013.01); *B66B 1/28* (2013.01); *B66B 3/002* (2013.01); *G06N 20/00* (2019.01);
(Continued)

(58) Field of Classification Search
CPC ......... B66B 1/2458; B66B 1/28; B66B 3/002; B66B 2201/402
See application file for complete search history.

(56) References Cited

U.S. PATENT DOCUMENTS 5,183,981 A * 2/1993 Thangavelu .......... B66B 1/2408
187/383
5,409,085 A * 4/1995 Fujino ................... B66B 1/2458
187/247
(Continued)

FOREIGN PATENT DOCUMENTS

JP  3-297769 A  12/1991
JP  8-217343 A  8/1996
(Continued)

OTHER PUBLICATIONS

Chinese Office Action issued Apr. 27, 2023 in corresponding Chinese Patent Application No. 201880095218.6 (with machine-generated English translation), 10 pages.
(Continued)

*Primary Examiner* — Rina I Duda
(74) *Attorney, Agent, or Firm* — XSENSUS LLP

(57) ABSTRACT

To provide an elevator group management device that can accurately present information about learning of operational efficiency of an elevator. The elevator group management device includes a traffic-flow estimating unit configured to estimate a traffic flow based on boarding and alighting floors of users and a number of boarding and alighting people of an elevator, a learning unit configured to determine a policy of running of a car based on the traffic flow estimated by the traffic-flow estimating unit, a simulation unit configured to evaluate operational efficiency at the time when the car is virtually run based on the policy determined by the learning unit, and a display control unit configured to cause an information display device to display information indicating a status of learning by the learning unit and the simulation unit.

10 Claims, 4 Drawing Sheets

(51) Int. Cl.
*B66B 3/00* (2006.01)
*G06N 20/00* (2019.01)

(52) U.S. Cl.
CPC ... *B66B 2201/211* (2013.01); *B66B 2201/402* (2013.01)

(56) References Cited

U.S. PATENT DOCUMENTS

| | | | | |
|---|---|---|---|---|
| 5,750,946 | A * | 5/1998 | Thangavelu | B66B 1/2458 187/382 |
| 5,780,789 | A * | 7/1998 | Tsuji | B66B 1/2458 187/382 |
| 5,841,084 | A * | 11/1998 | Thangavelu | B66B 1/2458 187/382 |
| 6,315,082 | B2 * | 11/2001 | Hikita | B66B 1/2458 187/382 |
| 6,345,697 | B1 * | 2/2002 | Siikonen | B66B 1/2458 187/382 |
| 8,286,755 | B2 * | 10/2012 | Eto | B66B 3/00 187/391 |

FOREIGN PATENT DOCUMENTS

| | | |
|---|---|---|
| JP | 8-324900 A | 12/1996 |
| JP | 2000-255917 A | 9/2000 |
| JP | 2007-31059 A | 2/2007 |

OTHER PUBLICATIONS

International Search Report and Written Opinion mailed on Aug. 14, 2018, received for PCT Application No. PCT/JP2018/025548, filed on Jul. 5, 2018, 11 Pages including English Translation.

Office Action issued on May 24, 2022, in corresponding Chinese patent Application No. 201880095218.6, 16 pages.

Office Action issued on Jan. 19, 2023, in corresponding Chinese patent Application No. 201880095218.6, 15 pages.

* cited by examiner

ELEVATOR GROUP MANAGEMENT DEVICE AND ELEVATOR SYSTEM

CROSS-REFERENCE TO RELATED APPLICATION

The present application is based on PCT filing PCT/JP2018/025548, filed Jul. 5, 2018, the entire contents of which are incorporated herein by reference.

FIELD

The present invention relates to an elevator group management device and an elevator system.

BACKGROUND

Patent Literature 1 discloses an elevator group management device. With the group management device, it is possible to externally inform a simulation result based on learning of a traffic demand in a predetermined period in an elevator.

CITATION LIST

Patent Literature

[PTL 1] JP 2000-255917 A

SUMMARY

Technical Problem

However, in the group management device described in Patent Literature 1, the simulation result is only informed. Accordingly, it is not possible to grasp an effect of the learning on operational efficiency.

The present invention has been made in order to solve the problem described above. An object of the present invention is to provide an elevator group management device and an elevator system that can accurately present information about learning of operational efficiency of an elevator.

Solution to Problem

An elevator group management device according to the present invention includes: a traffic-flow estimating unit configured to estimate a traffic flow based on boarding and alighting floors of users and a number of boarding and alighting people of an elevator; a learning unit configured to determine a policy of running of a car based on the traffic flow estimated by the traffic-flow estimating unit; a simulation unit configured to evaluate operational efficiency at a time when the car is virtually run based on the policy determined by the learning unit; and a display control unit configured to cause an information display device to display information indicating a status of learning by the learning unit and the simulation unit.

An elevator system according to the present invention is an elevator system including: an elevator group management device; and an information display device configured to display information from the elevator group management device, the elevator group management device including: a traffic-flow estimating unit configured to estimate a traffic flow based on boarding and alighting floors of users and a number of boarding and alighting people of the elevator; a learning unit configured to determine a policy of running of a car based on the traffic flow estimated by the traffic-flow estimating unit; a simulation unit configured to evaluate operational efficiency at a time when the car is virtually run based on the policy determined by the learning unit; and a display control unit configured to cause the information display device to display information indicating a status of learning by the learning unit and the simulation unit.

Advantageous Effects of Invention

According to these inventions, the group management device causes the information display device to display the status of the learning for evaluating the operational efficiency at the time when the car is virtually run based on the policy of the running of the car. Accordingly, it is possible to accurately present information about the learning of the operational efficiency of the elevator.

DESCRIPTION OF EMBODIMENTS

Figure 1:
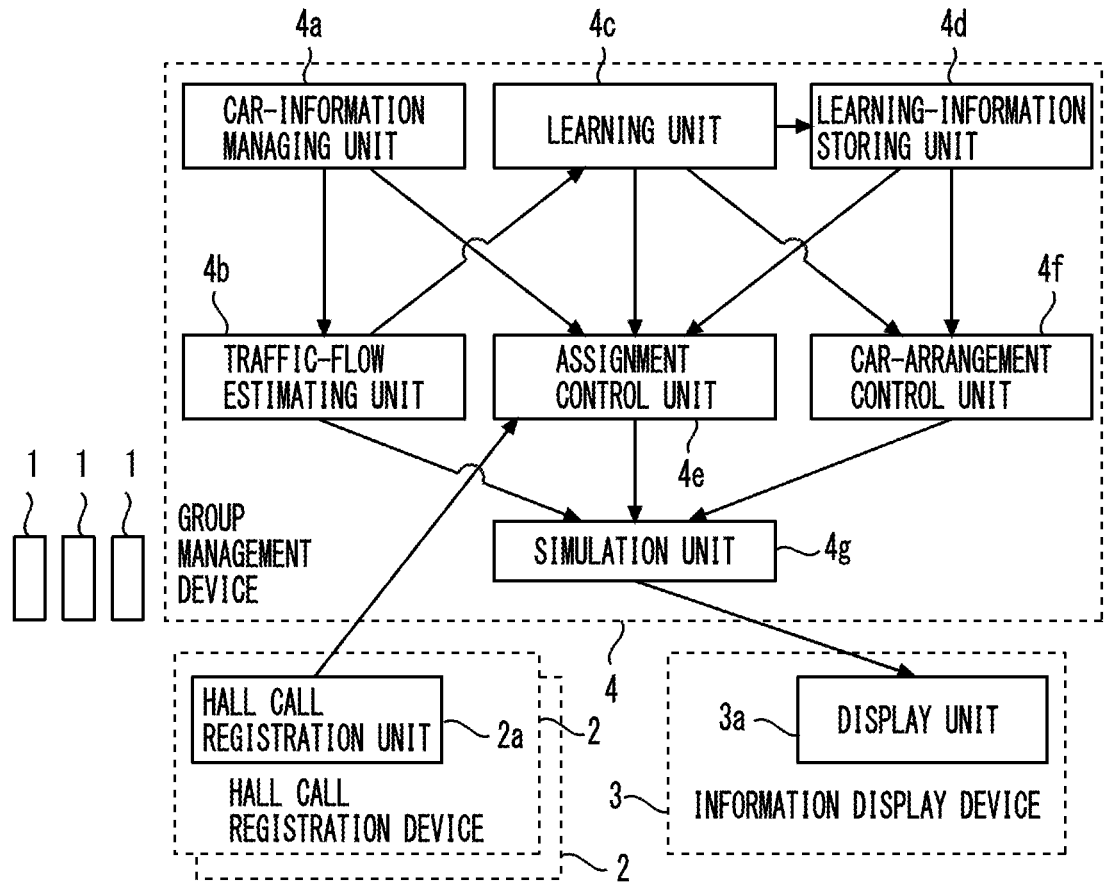
FIG. 1 is a configuration diagram of an elevator system to which an elevator group management device in a first embodiment is applied.

Modes for carrying out the present invention are explained with reference to the accompanying drawings. Note that, in the figures, the same or equivalent portions are denoted by the same reference numerals and signs. Repetitive descriptions of the portions are simplified or omitted as appropriate.

First Embodiment

FIG. 1 is a configuration diagram of an elevator system to which an elevator group management device in a first embodiment is applied.

The elevator system shown in FIG. 1 includes a plurality of cars 1, a plurality of hall call registration devices 2, at least one information display device 3, and a group management device 4.

Each of the plurality of cars 1 is positioned on the inside of a not-shown hoistway.

Each of the plurality of hall call registration devices 2 is provided in each of a plurality of halls provided in each of a plurality of floors of a building. Each of the plurality of hall call registration devices 2 includes a hall call registration unit 2a. The hall call registration unit 2a is provided to be able to, when a user receives an input of information concerning a direction of a destination floor or information concerning a destination floor name, output information concerning a destination direction or information concerning the destination floor together with information concerning a boarding floor as a hall call.

For example, the information display device 3 is a liquid crystal indicator provided on the inside of the car 1. The information display device 3 includes a display unit 3a. The display unit 3a is provided to be able to display information.

The group management device 4 includes a car-information managing unit 4a, a traffic-flow estimating unit 4b, a learning unit 4c, a learning-information storing unit 4d, an assignment control unit 4e, a car-arrangement control unit 4f, and a simulation unit 4g.

The car-information managing unit 4a is provided to be able to hold operation information, which is time-series information such as a position of each of the plurality of cars 1, information concerning a running direction of the car 1, information concerning a stop scheduled floor of the car 1, information concerning a call registered on the inside of the car 1 or in a hall, and information concerning a load value of the car 1.

The traffic-flow estimating unit 4b is provided to be able to analyze the operation information input from the car-information managing unit 4a. The traffic-flow estimating unit 4b is provided to be able to estimate boarding and alighting floors of users and a number of boarding and alighting people based on an analysis result of the operation information. The traffic-flow estimating unit 4b is provided to be able to generate traffic flow information based on an estimation result of the boarding and alighting floors the users and the number of boarding and alighting people.

The learning unit 4c determines, based on the traffic flow information input from the traffic-flow estimating unit 4b, at least one of an assignment control policy and a car arrangement control policy to be optimal from the viewpoints of operational efficiency, power consumption, and the like of the elevator.

The assignment control policy is a policy concerning selection of an algorism for assigning the car 1 responding to a registered hall call or a policy concerning selection of a set value of a parameter for adjusting an output of the algorithm for assigning the car 1 responding to the registered hall call. For example, operational efficiency of the elevator changes when the applied algorithm is changed or the parameter is adjusted to prioritize a specific floor according to a congestion state of the car 1.

The car arrangement control policy is a policy concerning setting for putting the car 1 not having assignment after alighting of all the users on standby in a specific floor. For example, when the users are coming to offices, boarding on the car 1 from a floor where an entrance of the building is present increases. Accordingly, the operational efficiency of the elevator changes when, irrespective of hall call registration, the car 1 from which all the users alight is always put on standby in the floor where the entrance of the building is present.

The learning-information storing unit 4d is provided to be able to store information concerning at least one of the assignment control policy and the car arrangement control policy input from the learning unit 4c.

The assignment control unit 4e is provided to be able to assign the hall call to any car 1 based on the operation information input from the car-information managing unit 4a and the information concerning the assignment control policy input from the learning unit 4c.

The car-arrangement control unit 4f is provided to be able to run the car 1 not having assignment after alighting of all the users to a floor selected based on the car arrangement control policy input from the learning unit 4c and put the car 1 on standby such that the users can quickly board the car 1.

The simulation unit 4g is provided to be able to estimate a pre-improvement average waiting time as operational efficiency based on assignment information from the assignment control unit 4e and car arrangement information from the car-arrangement control unit 4f in the case in which an assignment control policy and a car arrangement control policy in an unlearned state or a learning initial period held by the learning-information storing unit 4d are virtually applied to information concerning a present traffic flow input from the traffic-flow estimating unit 4b. The simulation unit 4g is provided to be able to estimate a post-improvement average waiting time as operational efficiency based on assignment information from the assignment control unit 4e and car arrangement information from the car-arrangement control unit 4f in the case in which a present assignment control policy and a present car arrangement control policy held by the learning-information storing unit 4d are virtually applied to the information concerning the present traffic flow input from the traffic-flow estimating unit 4b. The simulation unit 4g is provided to be able to compare and evaluate the estimated two operational efficiencies.

The simulation unit 4g is provided as a display control unit to be able to cause the display unit 3a of the information display device 3 to display information indicating a result of the evaluation by the simulation unit 4g to the users, an administrator, and the like as information of an improvement state of the operational efficiency. In this case, the simulation unit 4g is provided as the display control unit to be able to cause the display unit 3a of the information display device 3 to display information concerning a learning progress rate as well.

Subsequently, display by the information display device 3 is explained with reference to FIG. 2.

Figure 2:
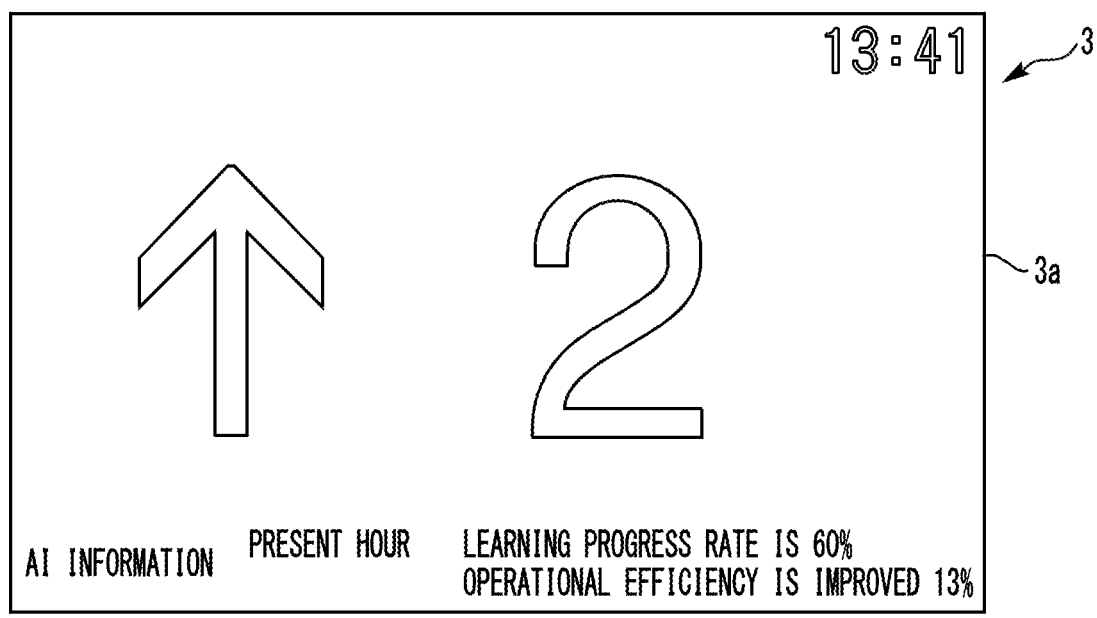
FIG. 2 is a front view of an information display device of the elevator system to which the elevator group management device in the first embodiment is applied.

FIG. 2 is a front view of the information display device of the elevator system to which the elevator group management device in the first embodiment is applied.

As shown in FIG. 2, in the information display device 3, information concerning a running direction of the car 1 is displayed on the left side of the center of the display unit 3a. Information concerning a floor corresponding to the position of the car 1 is displayed on the right side of the center of the display unit 3a. Information concerning a learning progress rate and information concerning an improvement state of operational efficiency are displayed in a lower part of the display unit 3a.

For example, as the information concerning the learning progress rate, display indicating "learning progress rate is 60%" is performed. For example, as the information concerning the improvement state of the operational efficiency, display indicating "operational efficiency is improved 13%" is performed.

Subsequently, an example of a time-series change of a learning progress rate is explained with reference to FIG. 3.

Figure 3:
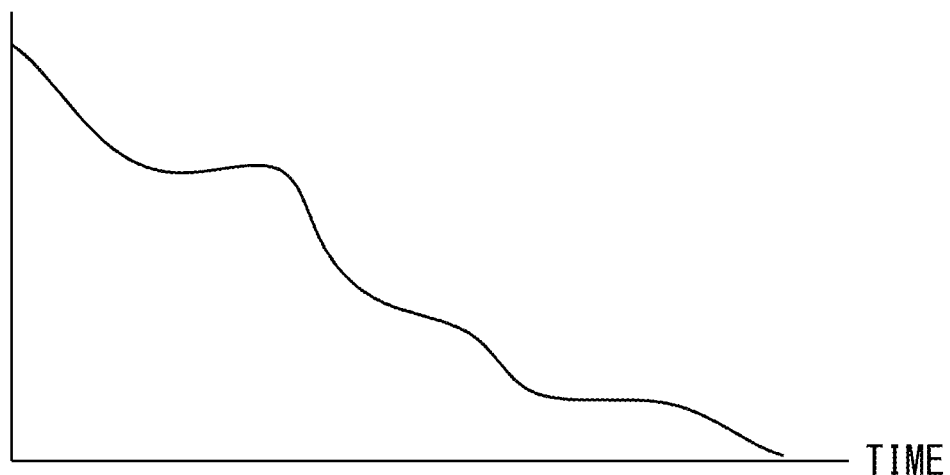
FIG. 3 is a diagram for explaining an example of a time-series change of a learning progress rate by the elevator group management device in the first embodiment.

FIG. 3 is a diagram for explaining an example of a time-series change of a learning progress rate by the elevator group management device in the first embodiment.

Usually, the learning unit 4c ends learning when a learning end condition set in advance as a condition for determining that it is a status in which no effect is obtained even if the learning is further continued is satisfied.

For example, the learning unit 4c ends the learning when the learning is performed by the number of times corresponding to a limit value set in advance as the number of times of learning at which a learning result is assumed to converge. In this case, a predicted remaining number of times of learning linearly decreases. For example, when the limit value of the number of times of learning is set to 10,000 times, if the present number of times of learning is 2,000 times, the learning progress rate is 20%.

For example, the learning unit 4c predicts the remaining number of times of learning from a difference between a learning value and a target value and calculates the learning progress rate from a ratio of the remaining number of times of learning to the number of times learning performed to that point. When the difference from the target value temporarily increases, as shown in FIG. 3, the predicted remaining times of learning sometimes increases.

Subsequently, an example of a calculation method for an improvement state of operational efficiency is explained with reference to FIG. 4.

Figure 4:
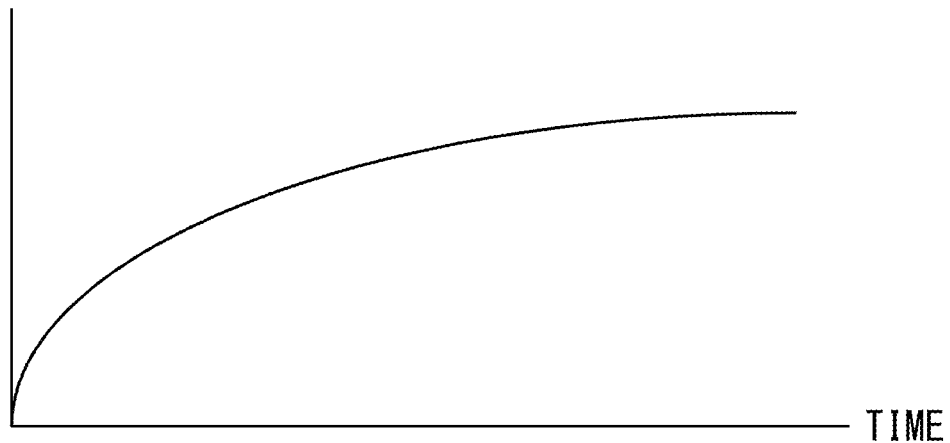
FIG. 4 is a diagram for explaining an example of a calculation method for an improvement state of operational efficiency by the elevator group management device in the first embodiment.

FIG. 4 is a diagram for explaining an example of a calculation method for an improvement state of operational efficiency by the elevator group management device in the first embodiment.

The simulation unit 4g calculates, as an improvement state of operational efficiency, a ratio of a difference between the pre-improvement average waiting time and the post-improvement average waiting time to the pre-improvement average waiting time.

For example, when the pre-improvement average waiting time is 30 seconds and the post-improvement average waiting time is 24 seconds, there is a difference of 6 seconds from 30 seconds. In this case, the simulation unit 4g calculates the improvement state of the operational efficiency assuming that the operational efficiency is improved 20%.

As shown in FIG. 4, when time elapses to a certain degree, the improvement state of the operational efficiency hardly changes.

Subsequently, an overview of the operation of the group management device 4 is explained with reference to FIG. 5.

Figure 5:
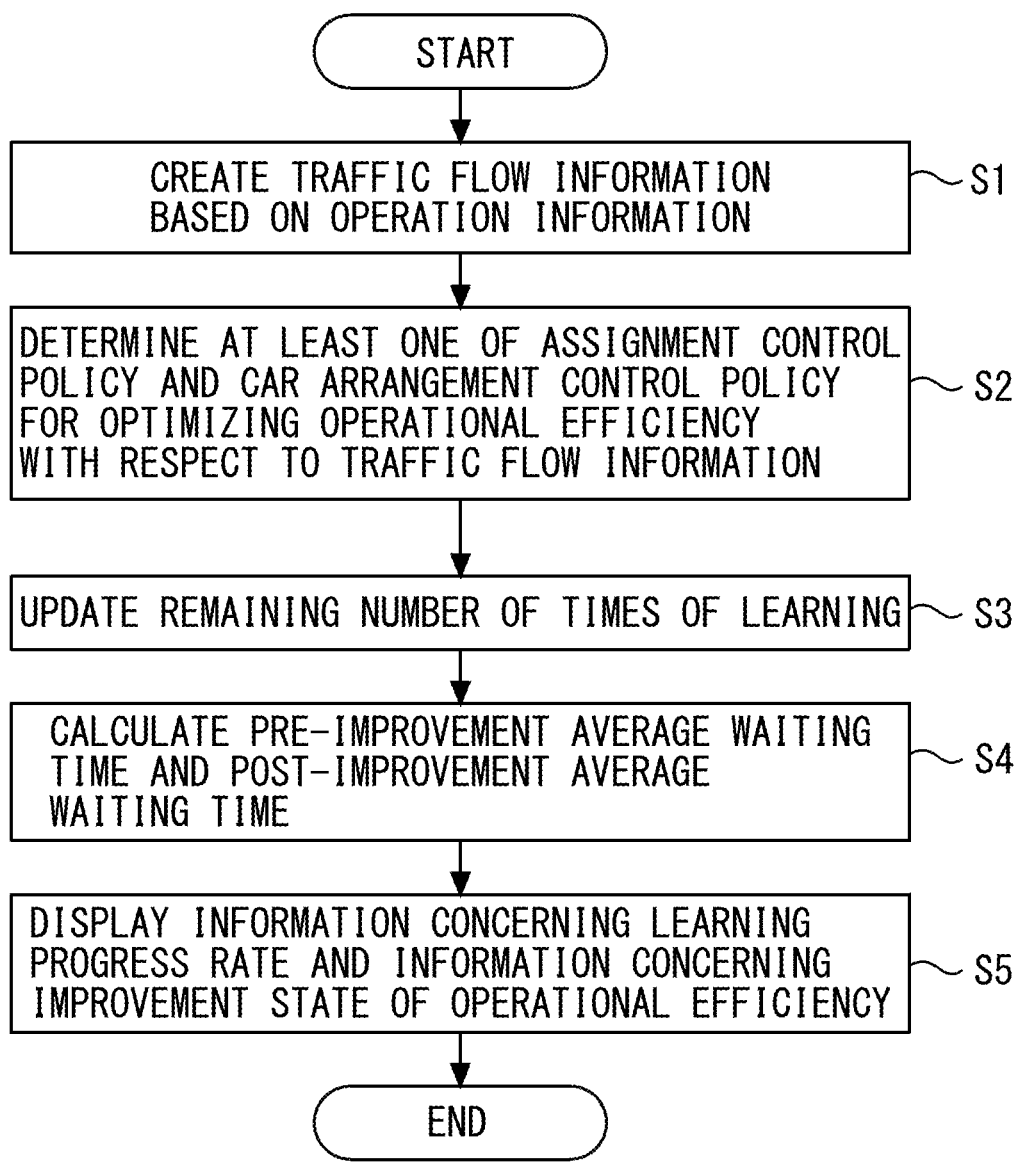
FIG. 5 is a flowchart for explaining an overview of the operation of the elevator group management device in the first embodiment.

FIG. 5 is a flowchart for explaining an overview of the operation of the elevator group management device in the first embodiment.

In step S1, the traffic-flow estimating unit 4b generates traffic flow information based on operation information input from the car-information managing unit 4a. Thereafter, in step S2, the learning unit 4c determines at least one of an assignment control policy and a car arrangement control policy for optimizing operational efficiency with respect to the traffic flow information input from the traffic-flow estimating unit 4b. At this time, the learning-information storing unit 4d stores information concerning the determined policy. Thereafter, in step S3, the learning unit 4c updates information concerning the remaining number of times of learning.

Thereafter, in step S4, the simulation unit 4g calculates a pre-improvement average waiting time and a post-improvement average waiting time. Thereafter, in step S5, the simulation unit 4g processes the information concerning the remaining number of times of learning obtained in step S3 and information concerning the average waiting times obtained in step S4 respectively into information concerning a learning progress rate and information concerning an improvement state of operational efficiency and causes the display unit 3a of the information display device 3 to display the information concerning the learning progress rate and the information concerning the improvement state of the operational efficiency.

According to the first embodiment explained above, the group management device 4 causes the information display device 3 to display a status of learning for evaluating operational efficiency at the time when the car 1 is virtually run based on a policy of running of the car 1. Accordingly, it is possible to accurately present information concerning the learning of the operational efficiency of the elevator. As a result, it is easy to draw up a future outlook. For example, it is possible to provide a determination material about whether continuous learning is necessary or whether other congestion measures are necessary. By displaying information on the information display device 3 of the car 1, it is possible to declare the functions of the product to the users of the elevator.

The group management device 4 causes the information display device 3 to display information indicating a present status with respect to the learning end condition. Accordingly, it is possible to present a determination material about whether there is a prospect of efficiency improvement by a learning function in future.

The group management device 4 causes the information display device 3 to display information indicating a ratio of a difference between operational efficiency at the time when the car 1 is virtually run based on a policy in the past and operational efficiency at the time when the car 1 is virtually run based on a present policy to the operational efficiency at the time when the car 1 is virtually run based on the policy in the past. Accordingly, it is possible to quantitatively present an effect of the learning function.

Note that an elevator control board provided for the administrator of the building may be used as the information display device 3. In this case, not only the present state but also the time-series changes shown in FIG. 3 and FIG. 4 may be shown.

As the operational efficiency, consumption energy efficiency may be set as a target rather than the waiting times of the users.

Subsequently, an example of the group management device 4 is explained with reference to FIG. 6.

Figure 6:
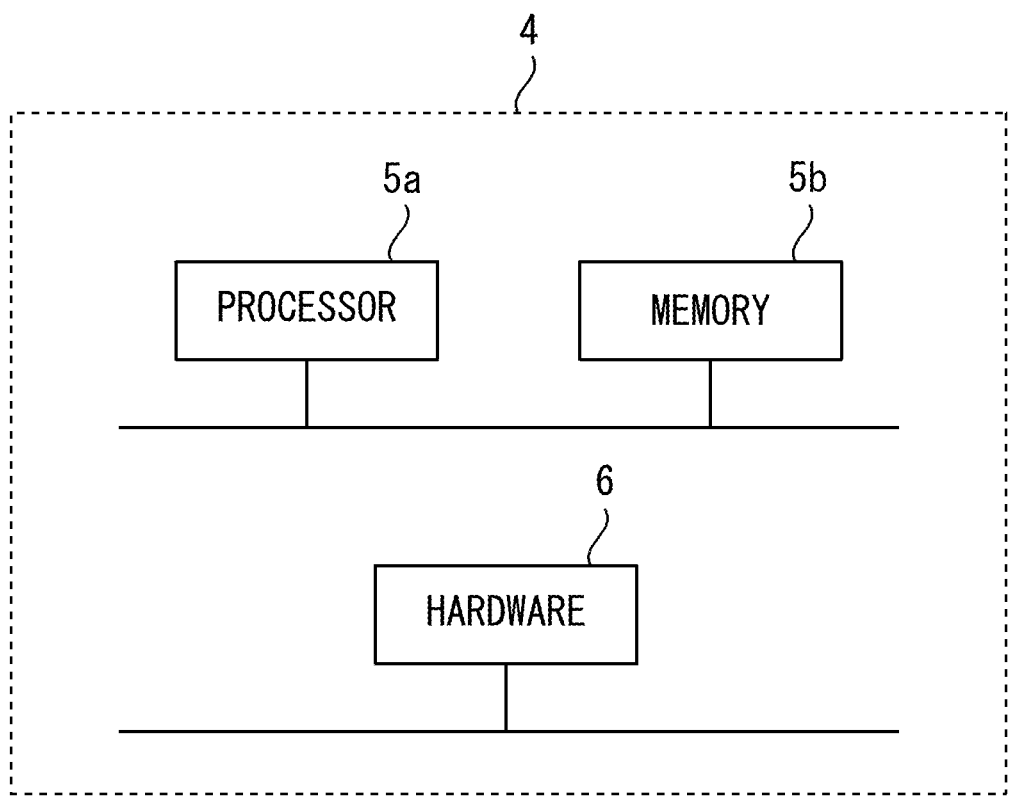
FIG. 6 is a hardware configuration diagram of the elevator group management device in the first embodiment.

FIG. 6 is a hardware configuration diagram of the elevator group management device in the first embodiment.

The functions of the group management device 4 can be implemented by a processing circuitry. For example, the processing circuitry includes at least one processor 5a and at least one memory 5b. For example, the processing circuitry includes at least one kind of dedicated hardware 6.

When the processing circuitry includes the at least one processor 5a and the at least one memory 5b, the functions of the group management device 4 are implemented by software, firmware, or a combination of the software and the firmware. At least one of the software and the firmware is described as a program. At least one of the software and the firmware is stored in the at least one memory 5b. The at least one processor 5a reads out and executes the program stored in the at least one memory 5b to thereby implement the functions of the group management device 4. The at least one processor 5a is also called a central processing unit, a processing device, an arithmetic operation device, a microprocessor, a microcomputer, or a DSP. For example, the at least one memory 5b is a nonvolatile or volatile semiconductor memory such as a RAM, a ROM, a flash memory, an EPROM, or an EEPROM, a magnetic disk, a flexible disk, an optical disk, a compact disk, a minidisk, a DVD, or the like.

When the processing circuitry includes the at least one kind of dedicated hardware 6, the processing circuitry is implemented by, for example, a single circuit, a composite circuit, a programmed processor, a parallel-programmed processor, an ASIC, an FPGA, or a combination of the single circuit, the composite circuit, the programmed processor, the parallel-programmed processor, the ASIC, and the FPGA.

For example, the functions of the group management device 4 are respectively implemented by processing circuitries. For example, the functions of the group management device 4 are collectively implemented by a processing circuitry.

A part of the functions of the group management device 4 may be implemented by the dedicated hardware 6 and the other part of the functions of the group management device 4 may be implemented by software or firmware. For example, the functions of the learning unit 4c and the simulation unit 4g may be implemented by a processing circuitry functioning as the dedicated hardware 6. The functions other than the functions of the learning unit 4c and the simulation unit 4g may be implemented by the at least one processor 5a reading out and executing a program stored in the at least one memory 5b

Note that the processor 5a and the memory 5b may be provided external to the group management device 4. For example, the functions of the learning unit 4c and the simulation unit 4g may be implemented by the at least one processor 5a on a cloud server present in a remote place reading out and executing a program stored in the at least one memory 5b. When the cloud server and the group management device 4 communicate with each other using a leased line or the Internet line, the learning unit 4c and the simulation unit 4g only have to exchange information with the other functions of the group management device 4.

In this way, the processing circuitry implements the functions of the group management device 4 with the hardware 6, the software, the firmware, or a combination of the hardware 6, the software, and the firmware.

Although not illustrated, the functions of the hall call registration device 2 are also implemented by a processing circuitry equivalent to the processing circuitry that implements the functions of the group management device 4. The functions of the information display device 3 are also implemented by a processing circuitry equivalent to the processing circuitry that implements the functions of the group management device 4.

INDUSTRIAL APPLICABILITY

As explained above, the elevator group management device and the elevator system according to the present invention can be used in an elevator.

REFERENCE SIGNS LIST

1 Car
2 Hall call registration device
2a Hall call registration unit
3 Information display device
3a Display unit
4 Group management device
4a Car-information managing unit
4b Traffic-flow estimating unit
4c Learning unit
4d Learning-information storing unit
4e Assignment control unit
4f Car-arrangement control unit
4g Simulation unit
5a Processor
5b Memory
6 Hardware

The invention claimed is:

1. An elevator group management device comprising:
processing circuitry configured to:
estimate a traffic flow based on boarding and alighting floors of users and a number of boarding and alighting people of an elevator,
determine a policy of running of a car based on the traffic flow estimated,
evaluate operational efficiency at a time when the car is virtually run based on the policy determined, and
display information indicating a status of learning,
the processing circuitry calculating, as an improvement state of the operational efficiency, a ratio of a difference between a pre-improvement average waiting time and a post-improvement average waiting time to the pre-improvement average waiting time.

2. The elevator group management device according to claim 1, wherein:
the processing circuitry determines a present status with respect to a learning end condition, and causes an information display device to display information indicating the status determined.

3. The elevator group management device according to claim 1, wherein:
the processing circuitry evaluates a second ratio of a difference between operational efficiency at a time when the car is virtually run based on a policy in past and operational efficiency at a time when the car is virtually run based on a present policy to the operational efficiency at the time when the car is virtually run based on the policy in the past, and causes an information display device to display information indicating the second ratio evaluated by the processing circuitry.

4. The elevator group management device according to claim 1, wherein:
the processing circuitry determines a present status with respect to a learning end condition.

5. The elevator group management device according to claim 1, wherein:
the processing circuitry evaluates a ratio of a difference between operational efficiency at a time when the car is virtually run based on a policy in past and operational efficiency at a time when the car is virtually run based on a present policy to the operational efficiency at the time when the car is virtually run based on the policy in the past.

6. The elevator group management device according to claim 2, wherein the present status is a percentage.

7. The elevator group management device according to claim 1, wherein:
the processing circuitry evaluates a second ratio of a difference between operational efficiency at a time when the car is virtually run based on a policy in past and operational efficiency at a time when the car is virtually run based on a present policy to the operational efficiency at the time when the car is virtually run based on the policy in the past, and causes an information display device to display information indicating the second ratio as a percentage.

8. The elevator group management device according to claim 2, wherein the information display device is located inside the car.

9. The elevator group management device according to claim 3, wherein the information display device is located inside the car.

10. An elevator system comprising:
an elevator group management device; and
an information display device configured to display information from the elevator group management device,
the elevator group management device including processing circuitry configured to:
estimate a traffic flow based on boarding and alighting floors of users and a number of boarding and alighting people of the elevator,
determine a policy of running of a car based on the traffic flow estimated,
evaluate operational efficiency at a time when the car is virtually run based on the policy determined, and
cause the information display device to display information indicating a status of learning,
the processing circuitry calculating, as an improvement state of the operational efficiency, a ratio of a difference between a pre-improvement average waiting time and a post-improvement average waiting time to the pre-improvement average waiting time.

* * * * *